US006947932B2

United States Patent
Brandin et al.

(10) Patent No.: US 6,947,932 B2
(45) Date of Patent: Sep. 20, 2005

(54) METHOD OF PERFORMING A SEARCH OF A NUMERICAL DOCUMENT OBJECT MODEL

(75) Inventors: Christopher Lockton Brandin, Colorado Springs, CO (US); Kevin Lawrence Huck, Woodland Park, CO (US); Linda Lee Grimaldi, Colorado Springs, CO (US)

(73) Assignee: Xpriori, LLC, Colorado Springs, CO (US)

( * ) Notice: Subject to any disclaimer, the term of this patent is extended or adjusted under 35 U.S.C. 154(b) by 900 days.

(21) Appl. No.: 09/768,101

(22) Filed: Jan. 23, 2001

(65) Prior Publication Data

US 2002/0099792 A1 Jul. 25, 2002

(51) Int. Cl.[7] .............................................. G06F 17/00
(52) U.S. Cl. ........................ 707/6; 707/101; 707/102; 715/513; 717/106
(58) Field of Search .................... 707/1–10, 100–104.1; 715/513–516; 717/106–108, 136–137; 702/200–205

(56) References Cited

U.S. PATENT DOCUMENTS

| 5,426,779 A | 6/1995 | Chambers, IV ............. 395/600 |
| 5,440,738 A | 8/1995 | Bowman et al. ............ 395/600 |
| 5,542,086 A | 7/1996 | Andrew et al. ............. 395/600 |

OTHER PUBLICATIONS

Clustering for Web information hierarchy mining Hung–Yu Kao; Ming–Syan Chen; Jan–Ming Ho; Web Intelligence, 2003. WI 2003. Proceedings. IEEE/WIC International Conference on, Oct. 13–17, 2003.*
Intelligent control and decision–making demonstrated on a simple compass–guided robot, Seabra Lopes, L.; Lau, N.; Reis, L.P.; Systems, Man and Cybernetics, 2000 IEEE International Conference on vol.: 4, Oct. 8–11, 2000.*
Streaming–media knowledge discovery, Pieper, J.; Srinivasan, S.; Dom, B.; Computer, vol.: 34, Issue 9, Sep. 2001.*

* cited by examiner

Primary Examiner—David Jung
(74) Attorney, Agent, or Firm—Law Office of Dale B. Halling, LLC (57) ABSTRACT

A method of performing a search of a numerical DOM (document object model), includes the steps of receiving a query. When the query is a fully qualified query, the target string is transformed to form a fully qualified hashing code. An associative lookup is performed in a map index using the fully qualified hashing code. A map offset is returned. The map offset points to a couplet that can be converted into a standard portion of a structured data document. Finally, a data couplet is returned.

22 Claims, 11 Drawing Sheets

_10_

```
18—<CATALOG>⸺12         22  16   24
20—  <CD>
26—     <TITLE>Empire Burlesque</TITLE>
        <ARTIST>Bob Dylan</ARTIST>
        <COUNTRY>USA</COUNTRY>
        <COMPANY>Columbia</COMPANY>
        <PRICE>10.90</PRICE>
        <YEAR>1985</YEAR>
     </CD>
     <CD>
        <TITLE>Hide your heart</TITLE>
        <ARTIST>BonnieTylor</ARTIST>
     <COUNTRY>UK</COUNTRY>
     <COMPANY>CBS Records</COMPANY>
        <PRICE>9.90</PRICE>
        <YEAR>1988</YEAR>
     </CD>
     <CD>
        <TITLE>Greatest Hits</TITLE>
        <ARTIST>Dolly Parton</ARTIST>
     <COUNTRY>USA</COUNTRY>
     <COMPANY>RCA</COMPANY>
        <PRICE>9.90</PRICE>
        <YEAR>1982</YEAR>
     </CD>
     <CD>
        <TITLE>Still got the blues</TITLE>
        <ARTIST>Gary More</ARTIST>
       <COUNTRY>UK</COUNTRY>
        <COMPANY>Virgin records</COMPANY>
        <PRICE>10.20</PRICE>
        <YEAR>1990</YEAR>
     </CD>
  </CATALOG>
                 14
```

FIG. 1

```
      52
   56  62  68  46
  54 58  64                                          40
  ┌─┬─┬─┬─┐
  1,B,S,[],0,1,ND>MetaData>http://neocore.com/docMetaData:TimeStamp>,
  1,N,I,[],0,4,ND>MetaData>http://neocore.com/docMetaData:DocID>,c:\testxml\testdoe.xml
42 1,N,E,[],0,4,ND>MetaData>http://neocore.com/docMetaData:SchemaName>,schema
   3,N,E,[],0,4,ND>MetaData>http://neocore.com/docMetaData:InstructFileName>,ifile
   1,N,E,[],0,2,ND>MyHeader>,Header 47─50
44─1,N,E,[],0,2,ND>CATALOG>CD>TITLE>,Empire Burlesque─16
66─1,N,E,[],5,4,ND>CATALOG>CD>ARTIST>Bob Dylan 48
   1,N,E,[],5,4,ND>CATALOG>CD>COUNTRY>,USA
   1,N,E,[],5,4,ND>CATALOG>CD>COMPANY>,Columbia
   1,N,E,[],5,4,ND>CATALOG>CD>PRICE>,10.90
   1,N,E,[],5,4,ND>CATALOG>CD>YEAR>,1985
2N,E,[],5,3,ND>CATALOG>CD>TITLE>,Hide your heart
   1,N,E,[],11,4,ND>CATALOG>CD>ARTIST>,Bonnie Tylor
   1,N,E,[],11,4,ND>CATALOG>CD>COUNTRY>,UK
   1,N,E,[],11,4,ND>CATALOG>CD>COMPANY>,CBS Records
   1,N,E,[],11,4,ND>CATALOG>CD>PRICE>,9.90
2N,E,[],11,4,ND>CATALOG>CD>YEAR>,1988
   1,N,E,[],5,3,ND>CATALOG>CD>TITLE>,Greatest Hits
   1,N,E,[],17,4,ND>CATALOG>CD>ARTIST>Dolly Parton
   1,N,E,[],17,4,ND>CATALOG>CD>COUNTRY>,USA
   1,N,E,[],17,4,ND>CATALOG>CD>COMPANY>,RCA
   1,N,E,[],17,4,ND>CATALOG>CD>PRICE>,9.90
2N,E,[],17,4,ND>CATALOG>CD>YEAR>,1982
   1,N,E,[],5,3,ND>CATALOG>CD>TITLE>,Still got the blues
   1,N,E,[],23,4,ND>CATALOG>CD>ARTIST>,Gary More
   1,N,E,[],23,4,ND>CATALOG>CD>COUNTRY>,UK
   1,N,E,[],23,4,ND>CATALOG>CD>COMPANY>,Virgin Records
   1,N,E,[],23,4,ND>CATALOG>CD>PRICE>,10.20
2N,E,[],23,4,ND>CATALOG>CD>YEAR>,1990
```

METHOD OF PERFORMING A SEARCH OF A NUMERICAL DOCUMENT OBJECT MODEL

RELATED APPLICATIONS

This patent application is related to the U.S. patent application, Ser. No. 09/419,217, entitled "Memory Management System and Method" filed on Oct. 15, 1999, assigned to the same assignee as the present application and the U.S. patent application, Ser. No. 09/768,102 entitled "Method of Storing a Structured Data Document" filed on Jan. 23, 2001, assigned to the same assignee as the present application and the U.S. patent application, Ser. No. 09/767,797, entitled "Method and System for Storing a Flattened Structured Data Document" filed on Jan. 23, 2001, assigned to the same assignee as the present application and the U.S. patent application, Ser. No. 09/767,493, entitled "Method of Operating an Extensible Markup Language Database" filed on Jan. 23, 2001, assigned to the same assignee as the present application.

FIELD OF THE INVENTION

The present invention relates generally to the field of structured data documents and more particularly to a method of performing a search of a numerical document object model (DOM).

BACKGROUND OF THE INVENTION

Structured data documents such as HTML (Hyper Text Markup Language), XML (extensible Markup Language) and SGML (Standard Generalized Markup Language) documents and derivatives use tags to describe the data associated with the tags. This has an advantage over databases in that not all the fields are required to be predefined. XML is presently finding widespread interest for exchanging information between businesses. XML appears to provide an excellent solution for internet business to business applications. Unfortunately, XML documents require a lot of memory and therefore are time consuming and difficult to search.

Thus there exists a need for a method of performing a search of a numerical document object model that reduces the memory and speeds up the time to search structured data documents.

BRIEF DESCRIPTION OF THE DRAWINGS

FIG. 2 is an example of a flattened data document in accordance with one embodiment of the invention;

DETAILED DESCRIPTION OF THE DRAWINGS

A method of performing a search of a numerical DOM (document object model), includes the steps of receiving a query. When the query is a fully qualified query, the target string is transformed to form a fully qualified hashing code. The target string of a fully qualified query is a complete tag string or a complete data string. An associative lookup is performed in a map index using the fully qualified hashing code. A map offset is returned. The map offset points to a couplet that can be converted into a standard portion of a structured data document. Finally, a data couplet is returned. Since the structured data document has been converted into a numerical DOM, it requires significantly less memory to store. This significantly reduces the time to search the document. In addition, once the document has been converted into a numerical DOM, it is no longer necessary to look at the underlying document to perform a search.

Figure 1:
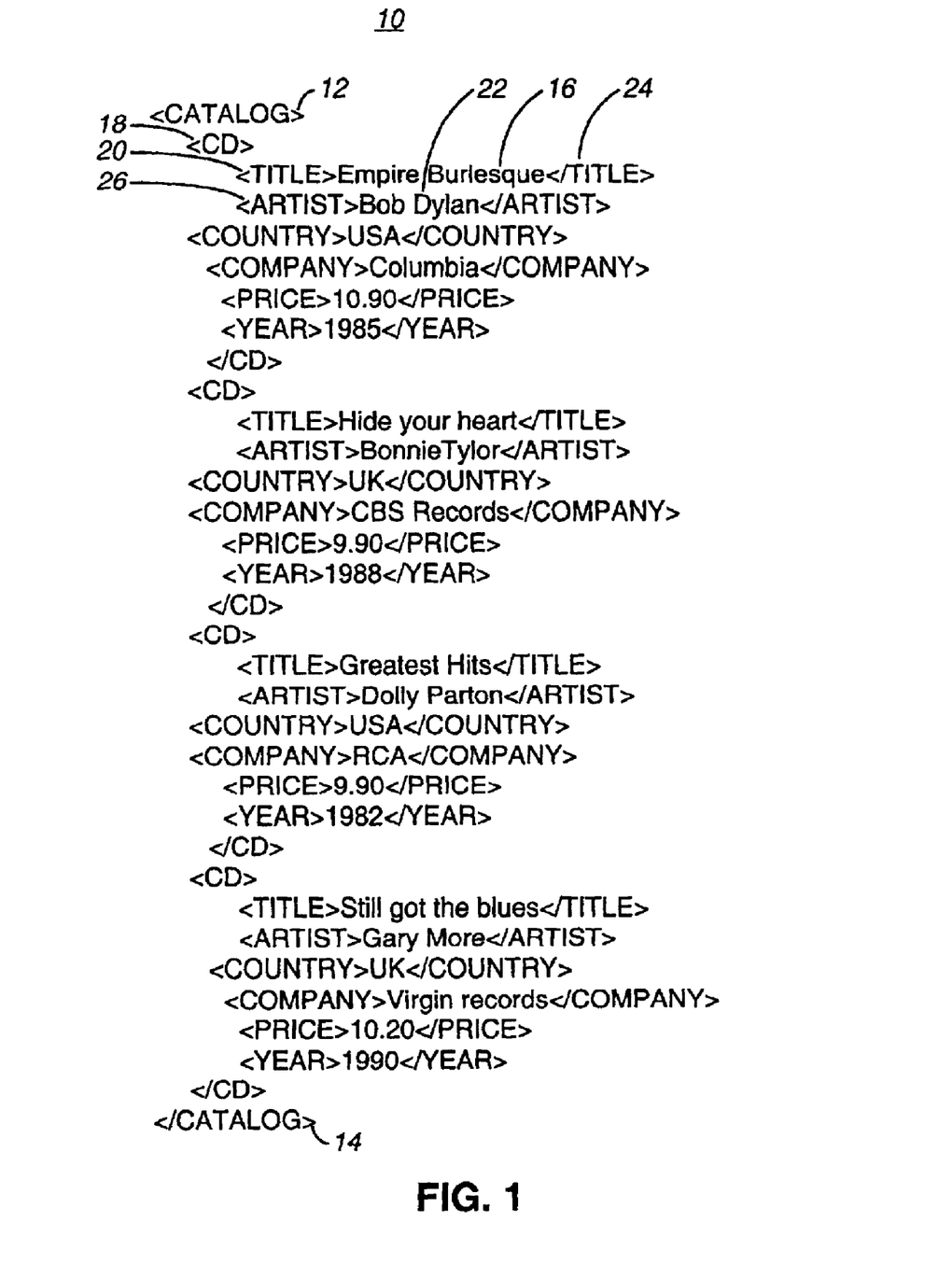
FIG. 1 is an example of an XML document in accordance with one embodiment of the invention.

FIG. 1 is an example of an XML document 10 in accordance with one embodiment of the invention. The words between the < > are tags that describe the data. This document is a catalog 12. Note that all tags are opened and later closed. For instance <catalog> 12 is closed at the end of the document </catalog> 14. The first data item is "Empire Burlesque" 16. The tags <CD> 18 and <TITLE> 20 tell us that this is the title of the CD (Compact Disk). The next data entry is "Bob Dylan" 22, who is the artist. Other compact disks are described in the document.

FIG. 2 is an example of a flattened data document (numerical document object model) 40 in accordance with one embodiment of the invention. The first five lines 42 are used to store parameters about the document. The next line (couplet) 44 shows a line that has flattened all the tags relating to the first data entry 16 of the XML document 10. Note that the tag <ND> 46 is added before every line but is not required by the invention. The next tag is CATALOG> 47 which is the same as in the XML document 10. Then the tag CD> 48 is shown and finally the tag TITLE> 50. Note this is the same order as the tags in the XML document 10. A plurality of formatting characters 52 are shown to the right of each line. The first column is the n-tag level 54. The n-tag defines the number of tags that closed in that line. Note that first line 44, which ends with the data entry "Empire Burlesque" 16, has a tag 24 (FIG. 1) that closes the tag TITLE. The next tag 26 opens the tag ARTIST. As a result the n-tag for line 44 is a one. Note that line 60 has an n-tag of two. This line corresponds to the data entry 1985 and both the YEAR and the CD tags are closed.

The next column 56 has a format character that defines whether the line is first (F) or another line follows it (N-next) or the line is the last (L). The next column contains a line type definition 58. Some of the line types are: time stamp (S); normal (E); identification (I); attribute (A); and processing (P). The next column 62 is a delete level and is enclosed in a parenthesis. When a delete command is received the data is not actually erased but is eliminated by entering a number in the parameters in a line to be erased. So for instance if a delete command is received for "Empire Burlesque" 16, a "1" would be entered into the parenthesis of line 44. If a delete command was received for "Empire Burlesque" 16 and <TITLE>, </TITLE>, a "2" would be entered into the parenthesis. The next column is the parent line 64 of the current line. Thus the parent line for the line 66 is the first line containing the tag CATALOG. If you count the lines you will see that this is line five (5) or the preceding line. The last column of formatting characters is a p-level 68. The p-level 68 is the first new tag opened but not closed. Thus at line 44, which corresponds to the data entry "Empire Burlesque" 16, the first new tag opened is CATALOG. In addition the tag CATALOG is not closed. Thus the p-level is two (2).

Figure 3:
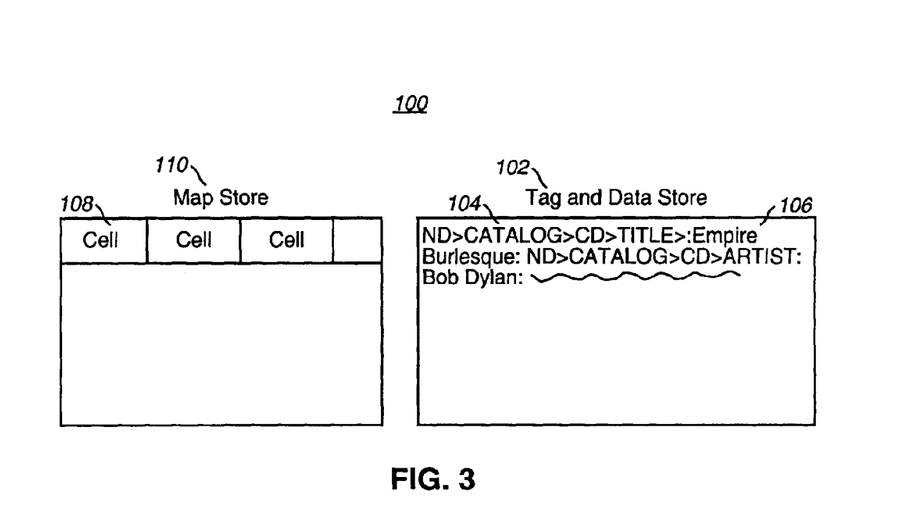
FIG. 3 is a block diagram of a system for storing a flattened data document in accordance with one embodiment of the invention.

FIG. 3 is a block diagram of a system 100 for storing a flattened data document in accordance with one embodiment of the invention. Once the structured data document is flattened as shown in FIG. 2, it can be stored. Each unique tag or unique set of tags for each line is stored to a tag and data store 102. The first entry in the tag and data store is ND>CATALOG>CD>TITLE> 104. Next the data entry "Empire Burlesque" 106 is stored in the tag and data store 102. The pointers to the tag and data entry in the tag and data store 102 are substituted into line 44. Updated line 44 is then stored in a first cell 108 of the map store 110. In one embodiment the tag store and the data store are separate. The tag and data store 102 acts as a dictionary, which reduces the required memory size to store the structured data document.

Note that the formatting characters allow the structured data document to be completely reconstructed.

Figure 4:
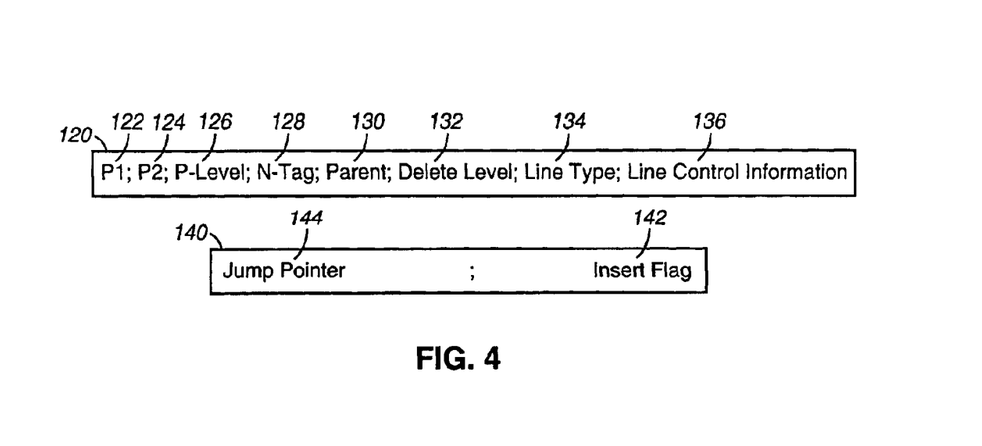
FIG. 4 shows two examples of a map store cell in accordance with one embodiment of the invention.

FIG. 4 shows two examples of a map store cell in accordance with one embodiment of the invention. The first example 120 works as described above. The cell (couplet) 120 has a first pointer ($P_1$) 122 that points to the tag in the tag and data store 102 and a second pointer ($P_2$) 124 that points to the data entry. The other information is the same as in a flattened line such as: p-level 126; n-tag 128; parent 130; delete level 132; line type 134; and line control information 136. The second cell type 140 is for an insert. When an insert command is received a cell has to be moved. The moved cell is replaced with the insert cell 140. The insert cell has an insert flag 142 and a jump pointer 144. The moved cell and the inserted cell are at the jump pointer.

Figure 5:
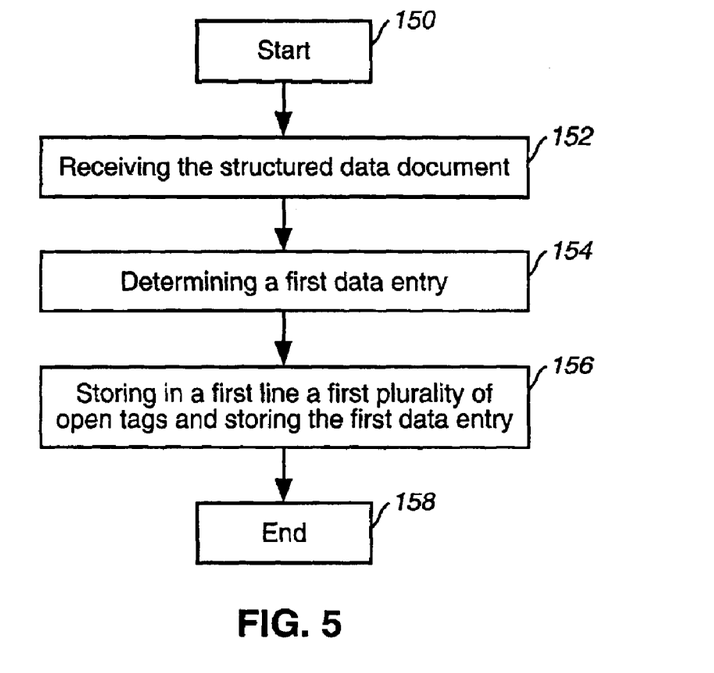
FIG. 5 is a flow chart of a method of storing a structured data document in accordance with one embodiment of the invention.

FIG. 5 is a flow chart of a method of storing a structured data document. The process starts, step 150, by receiving the structured data document at step 152. A first data entry is determined at step 154. In one embodiment, the first data entry is an empty data slot. At step 156 a first plurality of open tags and the first data entry is stored which ends the process at step 158. In one embodiment a level of a first opened tag is determined. The level of the first opened tag is stored. In another embodiment, a number of consecutive tags closed after the first data entry is determined. This number is then stored. A line number is stored.

In one embodiment, a next data entry is determined. A next plurality of open tags proceeding the next data entry is stored. These steps are repeated until a next data entry is not found. Note that the first data entry may be a null. A plurality of format characters associated with the next data entry are also stored. In one embodiment the flattened data document is expanded into the structured data document using the plurality of formatting characters.

Figure 6:
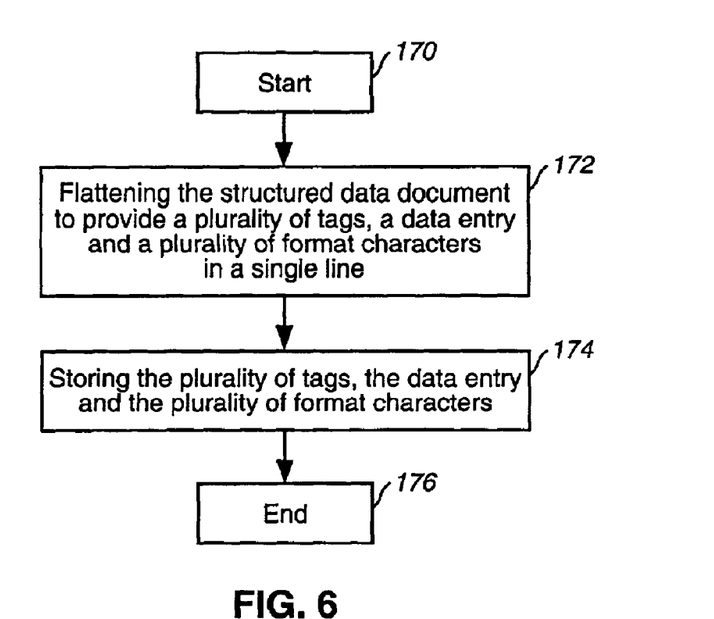
FIG. 6 is a flow chart of a method of storing a structured data document in accordance with one embodiment of the invention.

FIG. 6 is a flow chart of a method of storing a structured data document. The process starts, step 170, by flattening the structured data document to a provide a plurality of tags, a data entry and a plurality of format characters in a single line at step 172. At step 174 the plurality of tags, the data entry and the plurality of format characters are stored which ends the process at step 176. In one embodiment, the plurality of tags are stored in a tag and data store. In addition, the plurality of format characters are stored in map store. The data entry is stored in the tag and data store. A first pointer in the map store points to the plurality of tags in the tag and data store. A second pointer is stored in the map store that points to the data store. In one embodiment, the structured data document is received. A first data entry is determined. A first plurality of open tags preceding the first data entry and the first data entry are placed in a first line. A next data entry is determined. A next plurality of open tags proceeding the next data entry is placed in the next line. These steps are repeated until a next data entry is not found. In one embodiment a format character is placed in the first line. In one embodiment the format character is a number that indicates a level of a first tag that was opened. In one embodiment the format character is a number that indicates a number of tags that are consecutively closed after the first data entry. In one embodiment the format character is a number that indicates a line number of a parent of a lowest level tag. In one embodiment the format character is a number that indicates a level of a first tag that was opened but not closed. In one embodiment the format character is a character that indicates a line type. In one embodiment the format character indicates a line control information. In one embodiment the structured data document is an extensible markup language document. In one embodiment the next data entry is placed in the next line.

Figure 7:
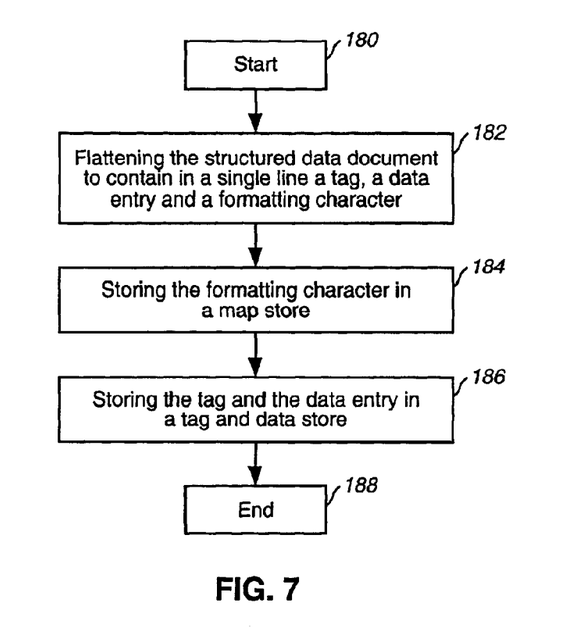
FIG. 7 is a flow chart of a method of storing a structured data document in accordance with one embodiment of the invention.

FIG. 7 is a flow chart of a method of storing a structured data document. The process starts, step 180, by flattening the structured data document to contain in a single line a tag, a data entry and a formatting character at step 182. The formatting character is stored in a map store at step 184. At step 186 the tag and the data entry are stored in a tag and data store which ends the process at step 188. In one embodiment a first pointer is stored in the map store that points to the tag in the tag and data store. A second pointer is stored in the map store that points to the data entry in the tag and data store. In one embodiment a cell is created in the map store for each of the plurality of lines in a flattened document. A request is received to delete one of the plurality of data entries. The cell associated with the one of the plurality of data entries is determined. A delete flag is set. Later a restore command is received. The delete flag is unset. In one embodiment, a request to delete one of a plurality of data entries and a plurality of related tags is received. A delete flag is set equal to the number of the plurality of related tags plus one. In one embodiment, a request is received to insert a new entry. A previous cell containing a proceeding data entry is found. The new entry is stored at an end of the map store. A contents of the next cell is moved after the new entry. An insert flag and a pointer to the new entry is stored in the next cell. A second insert flag and second pointer is stored after the contents of the next cell.

Thus there has been described a method of flattening a structured data document to form a numerical document object model (DOM). The process of flattening the structured data document generally reduces the number of lines used to describe the document. The flattened document is then stored using a dictionary to reduce the memory required to store repeats of tags and data. In addition, the dictionary (tag and data store) allows each cell in the map store to be a fixed length. The result is a compressed document that requires less memory to store and less bandwidth to transmit.

Figure 8:
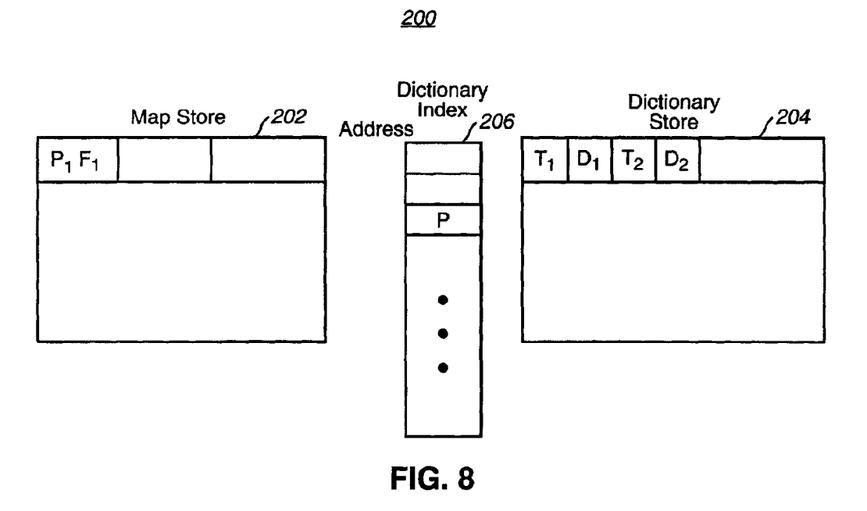
FIG. 8 is a block diagram of a system for storing a flattened structured data document in accordance with one embodiment of the invention.

FIG. 8 is a block diagram of a system 200 for storing a flattened structured data document (numerical DOM) in accordance with one embodiment of the invention. The system 200 has a map store 202, a dictionary store 204 and a dictionary index 206. Note that this structure is similar to the system of FIG. 3. The dictionary store 204 has essentially the same function as the map and tag store (FIG. 3) 102. The difference is that a dictionary index 206 has been added. The dictionary index 206 is an associative index. An associative index transforms the item to be stored, such as a tag, tags or data entry, into an address. Note that in one embodiment the transform returns an address and a confirmer as explained in the U.S. patent application, Ser. No. 09/419,217, entitled "Memory Management System and Method" filed on Oct. 15, 1999, assigned to the same assignee as the present application and hereby incorporated by reference. The advantage of the dictionary index 206 is that when a tag or data entry is received for storage it can be easily determined if the tag or data entry is already stored in the dictionary store 204. If the tag or data entry is already in the dictionary store the offset in the dictionary can be immediately determined and returned for use as a pointer in the map store 202.

Figure 9:
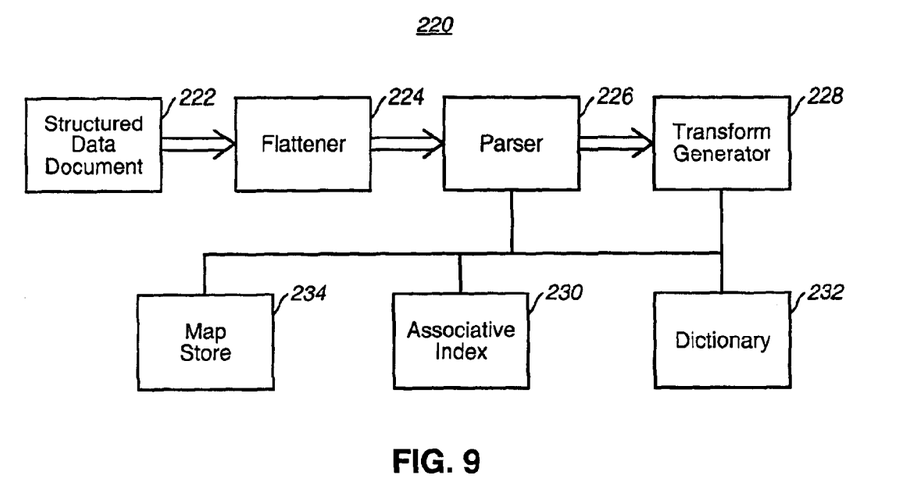
FIG. 9 is a block diagram of a system for storing a flattened structured data document in accordance with one embodiment of the invention.

FIG. 9 is a block diagram of a system 220 for storing a flattened structured data document (numerical DOM) in accordance with one embodiment of the invention. A structured data document 222 is first processed by a flattener 224. The flattener 224 performs the functions described with respect to FIGS. 1 & 2 to form a numerical DOM. A parser 226 then determines the data entries and the associated tags. One of the data entries is transformed by the transform generator 228. This is used to determine if the data entry is in the associative index 230. When the data entry is not in the associative index 230, it is stored in the dictionary 232. A pointer to the data in the dictionary is stored at the appropriate address in the associative index 230. The pointer is also stored in a cell of the map store 234 as part of a flattened line.

Figure 10:
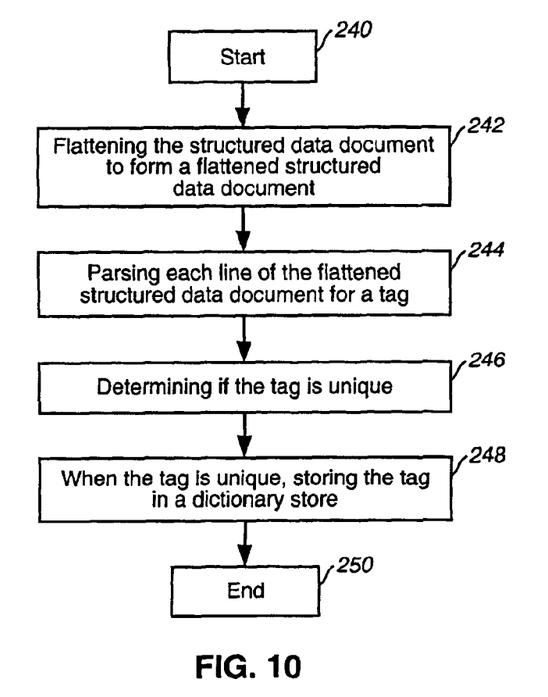
FIG. 10 is a flow chart of the steps used in a method of storing a flattened structured data document in accordance with one embodiment of the invention.

FIG. 10 is a flow chart of the steps used in a method of storing a flattened structured data document (numerical DOM) in accordance with one embodiment of the invention. The process starts, step 240, by flattening the structured data document to form a flattened structured data document (numerical DOM) at step 242. Each line of the flattened structured data document is parsed for a tag at step 244. Next it is determined if the tag is unique at step 246. When the tag is unique, step 248, the tag is stored in a dictionary store which ends the process at step 250. In one embodiment a tag dictionary offset is stored in the map store. A plurality of format characters are stored in the map store. When a tag is not unique, a tag dictionary offset is determined. The tag dictionary offset is stored in the map store.

In one embodiment, the tag is transformed to form a tag transform. An associative lookup is performed in a dictionary index using the tag transform. A map index is created that has a map pointer that points to a location in the map store of the tag. The map pointer is stored at an address of the map index that is associated with the tag transform.

Figure 11:
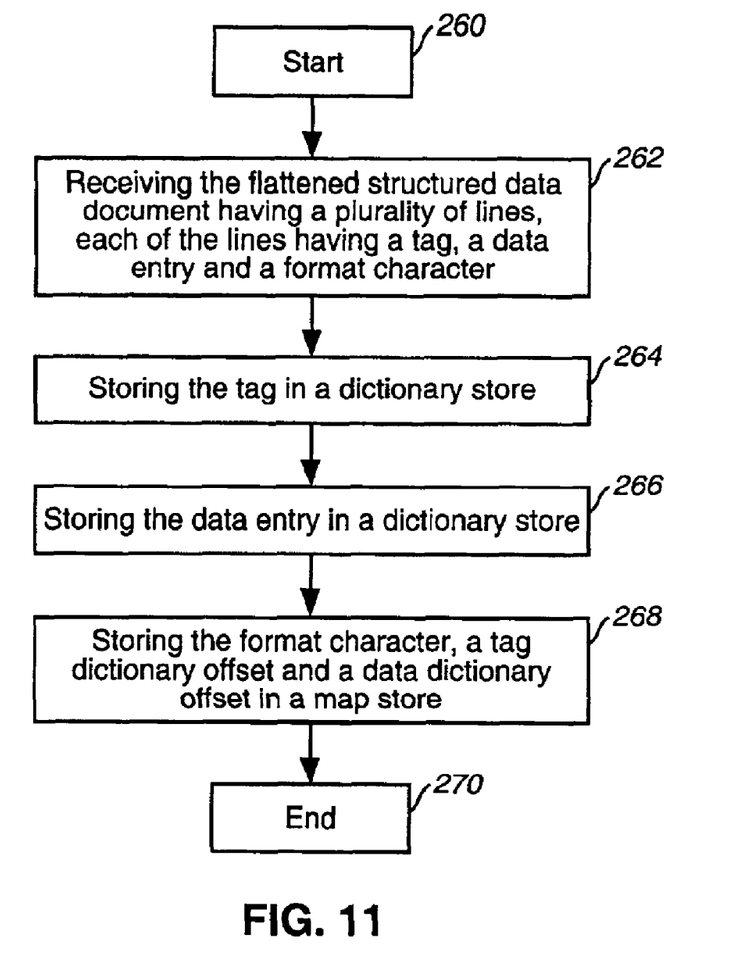
FIG. 11 is a flow chart of the steps used in a method of storing a flattened structured data document in accordance with one embodiment of the invention.

FIG. 11 is a flow chart of the steps used in a method of storing a flattened structured data document (numerical DOM) in accordance with one embodiment of the invention. The process starts, step 260, by receiving the flattened structured data document (numerical DOM) that has a plurality of lines (couplets) at step 262. Each of the plurality of lines contains a tag, a data entry and a format character. The tag is stored in a dictionary store at step 264. The data entry is stored in the dictionary store at step 266. At step 268 the format character, a tag dictionary offset and a data dictionary offset are stored in a map store which ends the process at step 270. In one embodiment, the tag is transformed to form a tag transform. The tag dictionary offset is stored in a dictionary index at an address pointed to by the tag transform. In one embodiment, it is determined if the tag is unique. When the tag is unique, the tag is stored in the dictionary store otherwise the tag is not stored (again) in the dictionary store. To determine if the tag is unique, it is determined if a tag pointer is stored in the dictionary index at an address pointed to by the tag transform.

In one embodiment, the data entry is transformed to form a data transform. The data dictionary offset is stored in the dictionary index at an address pointed to by the data transform. In one embodiment each of the flattened lines has a plurality of tags.

In one embodiment, a map index is created. Next it is determined if the tag is unique. When the tag is unique, a pointer to a map location of the tag is stored in the map index. When the tag is not unique, it is determined if a duplicates flag is set. When the duplicates flag is set, a duplicates count is incremented. When the duplicates flag is not set, the duplicates flag is set. The duplicates count is set to two. In one embodiment a transform of the tag with an instance count is calculated to form a first instance tag transform and a second instance tag transform. A first map pointer is stored in the map index at an address associated with the first instance transform. A second map pointer is stored in the map index at an address associated with the second instance transform.

In one embodiment a transform of the tag with an instances count equal to the duplicates count is calculated to form a next instance tag transform. A next map pointer is stored in the map index at an address associated with the next instance transform.

In one embodiment, a map index is created. Next it is determined if the data entry is unique. When the data entry is unique, a pointer to a map location of the tag is stored.

Thus there has been described an efficient manner of storing a structured data document that requires significantly less memory than conventional techniques. The associative indexes significantly reduces the overhead required by the dictionary.

Figure 12:
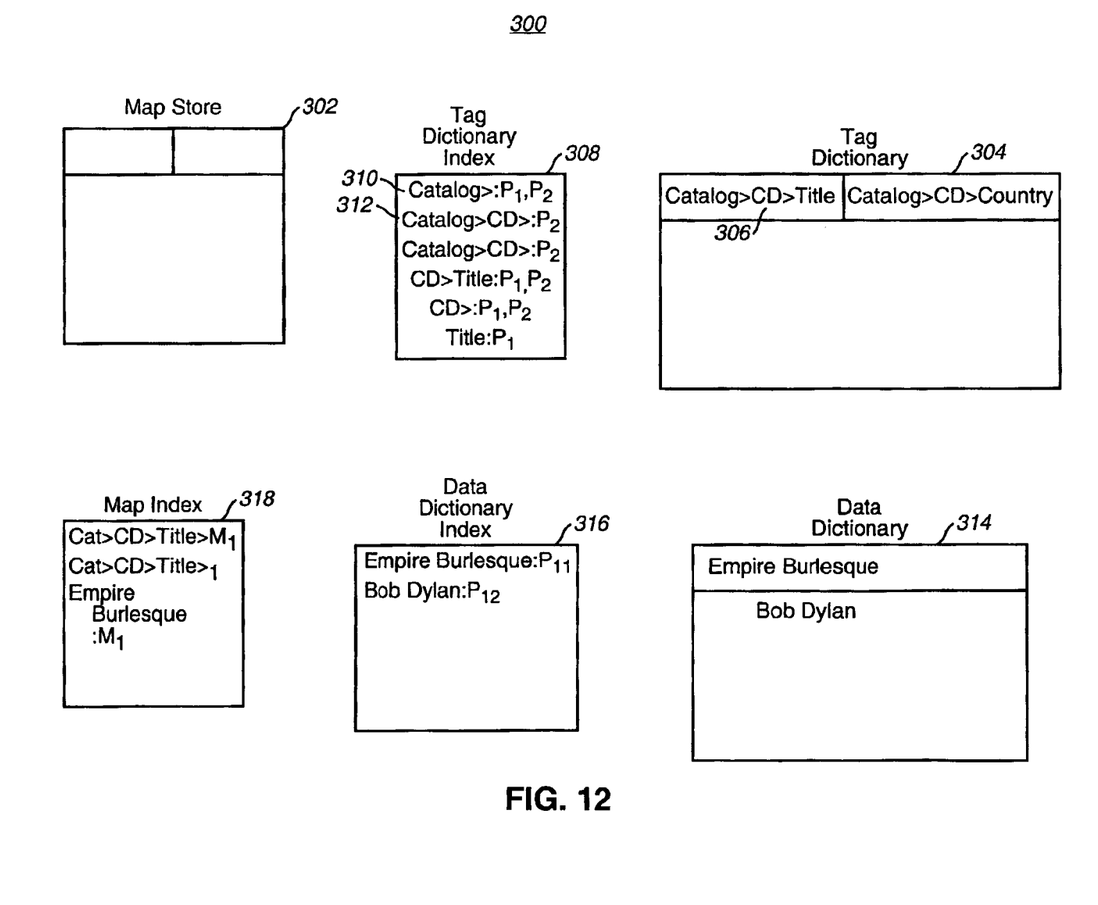
FIG. 12 is a schematic diagram of a method of storing a numerical document object model in accordance with one embodiment of the invention.

FIG. 12 is a schematic diagram of a method of storing a numerical document object model in accordance with one embodiment of the invention. This is similar to the models described with respect to FIGS. 3 & 8. The couplets (flattened lines) are stored in the map store 302. A tag dictionary 304 stores a copy of each unique tag string. For instance, the tag string CATALOG>CD>TITLE> 306 from line 44 (see FIG. 2) is stored in the tag dictionary 304. Note that the tag ND> is associated with every line and therefor has been ignored for this discussion. A tag dictionary index 308 is created. Every tag, incomplete tag string and complete tag string is indexed. As a result the tag CATALOG> 310, CATALOG>CD> 312 and every other permutation is stored in the tag index 308. Since a tag may occur in multiple entries it may have a number of pointers associated with the tag in the index.

A data dictionary 314 stores a copy of each unique data entry such as "Bob Dylan". A data dictionary index 316 associates each data entry with its location in the dictionary. In one embodiment, the tag dictionary index and the data dictionary index are associative memories. Thus a mathematical transformation of the entry such as "Bob Dylan" provides the address in the index where a pointer to the entry is stored. In addition to the tag and data indices a map index 318 is created. The map index 318 contains an entry for every complete tag string (see string 306) and the complete tag string and associated data entry. Note that the map index may be an associative index. By creating these indices and dictionaries it is possible to quickly and efficiently search a structured data document. In addition, once the document is in this form it is possible to search for a data entry without ever having to look at the original document.

Figure 13:
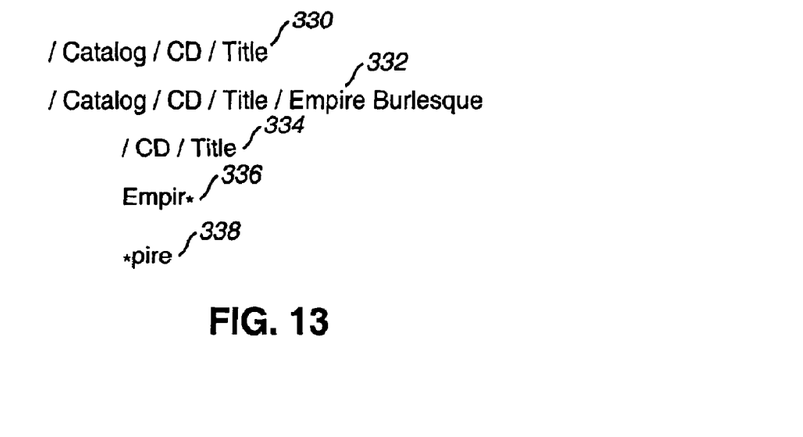
FIG. 13 shows several examples of search queries of a numerical document object model in accordance with one embodiment of the invention.

FIG. 13 shows several examples of search queries of a numerical document object model in accordance with one embodiment of the invention. The first example 330 is a fully qualified query since a complete tag string has been specified. The second example 332 is also a fully qualified query since a complete tag string and a complete data entry have been specified. The third example is a not fully qualified query since a partially complete tag string has been specified. The fourth 336 and fifth 338 examples are also examples of a not fully qualified query since the data entry is not complete. Note that the * stands for any wild card. If the data entry were completely specified, the query would be fully qualified.

Figure 14:
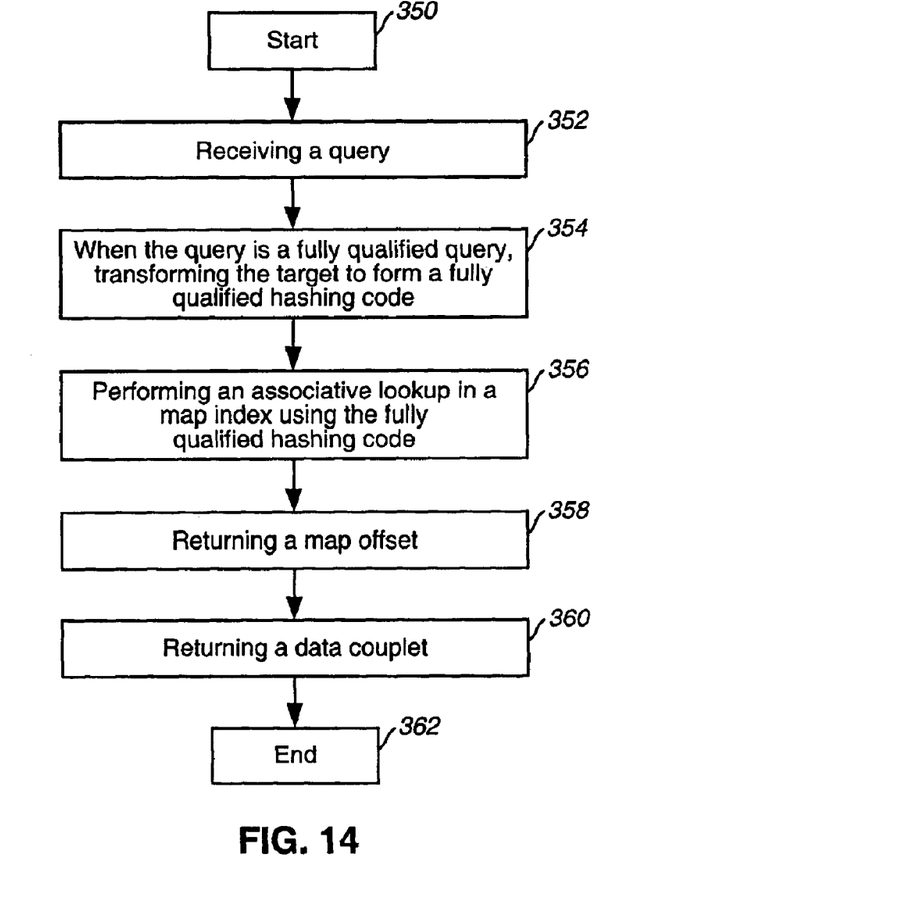
FIG. 14 is a flow chart of the steps used in a method of performing a search of a numerical document object model in accordance with one embodiment of the invention.

FIG. 14 is a flow chart of the steps used in a method of performing a search of a numerical document object model in accordance with one embodiment of the invention. The process starts, step 350, by receiving a query at step 352. When the query is a fully qualified query, the target is transformed to form a fully qualified hashing code at step 354. Note the phrase "fully qualified hashing code" means the hashing code for the target of a fully qualified query. In one embodiment the hashing code a mathematical transformation of the target to produce an address and a confirmer as explained in the U.S. patent application, Ser. No. 09/419, 217, entitled "Memory Management System and Method" filed on Oct. 15, 1999, assigned to the same assignee as the present application and hereby incorporated by reference. An associative lookup in a map index is performed using the fully qualified hashing code at step 356. At step 358, a map offset is returned. At step 360, a data couplet is returned which ends the process at step 362. In one embodiment, an identified couplet of the numerical DOM (as stored in the map) is converted into an XML string. When the query is partially qualified, the target is transformed to form a partially qualified hashing code. An associative lookup is performed in a dictionary index using the partially qualified hashing code. A partially qualified query is one that does not contain a complete tag or data string, i.e, <TITLE> instead of ND>CATALOG>CD>TITLE>, of <Dylan> instead of <Bob Dylan>. A dictionary offset is returned. The complete string is located in the dictionary, using the dictionary offset. A pointer is located in a map index using the complete string. The complete reference is located in the numerical DOM using the pointer. The data couplet is converted into a data XML string.

In another embodiment, when the query includes a wildcard target, the dictionary is scanned for the wildcard target. A complete string is returned from the dictionary that contains the wildcard target. A pointer is located in a map index using the complete string. A couplet is located in the numerical DOM using the pointer.

In one embodiment the hashing code is determined using linear feedback shift register operation, such as (but not limited to) a cyclical redundancy code. In another embodiment, the hashing code is determined by using a modulo two polynomial division. In one embodiment, the divisor polynomial is an irreducible polynomial. Other hashing codes may also be used.

Figure 15:
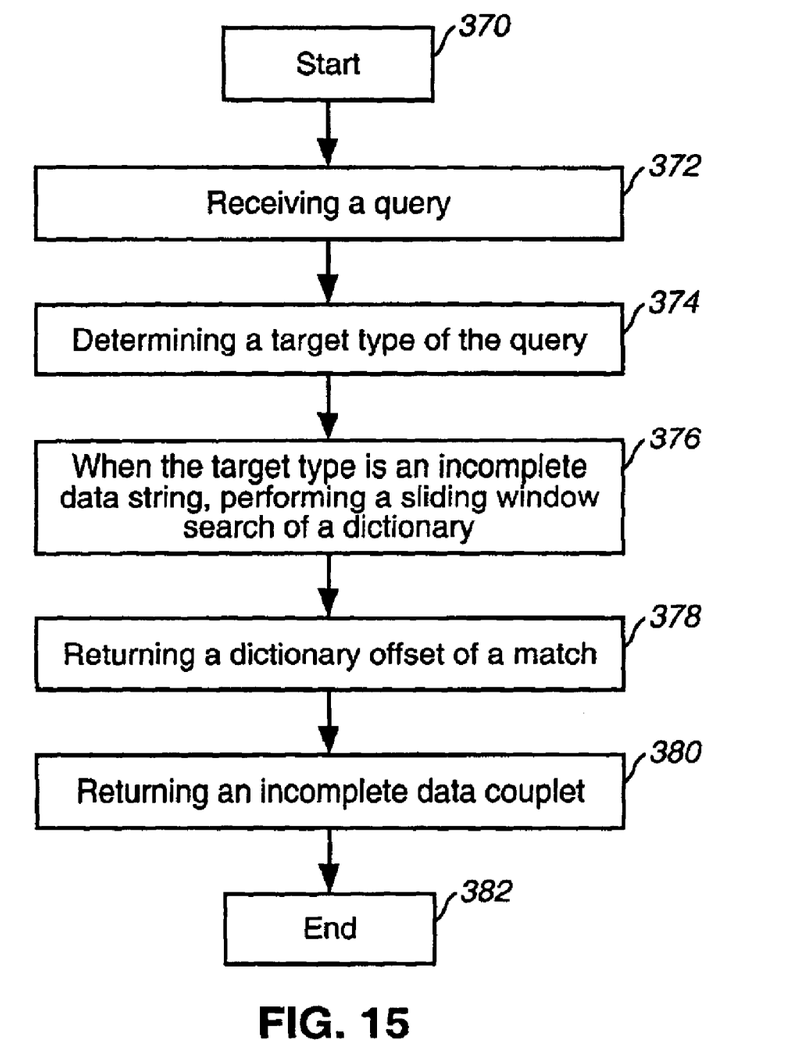
FIG. 15 is a flow chart of the steps used in a method of performing a search of a numerical document object model in accordance with one embodiment of the invention.

FIG. 15 is a flow chart of the steps used in a method of performing a search of a numerical document object model in accordance with one embodiment of the invention. The process starts, step 370, by receiving a query at step 372. A target type of the query is determined at step 374. When the target type is an incomplete data string, a sliding window search of a dictionary is performed at step 376. An incomplete data string could be <Bob> instead of <Bob Dylan>. A dictionary offset of a match is returned at step 378. In one embodiment a plurality of dictionary offsets are returned. At step 380 an incomplete data couplet is returned which ends the process at step 382. When the target type is an incomplete tag and a complete data string, the incomplete tag is transformed to form an incomplete target hashing code. An associative lookup in a map index is performed using the incomplete tag hashing code. At least one map offset is returned. The complete data string is transformed to form a complete data string hashing code. An associative lookup is performed in the map index. A data string map offset is returned. Next, the at least one map offset is compared with the data string map offset.

Figure 16:
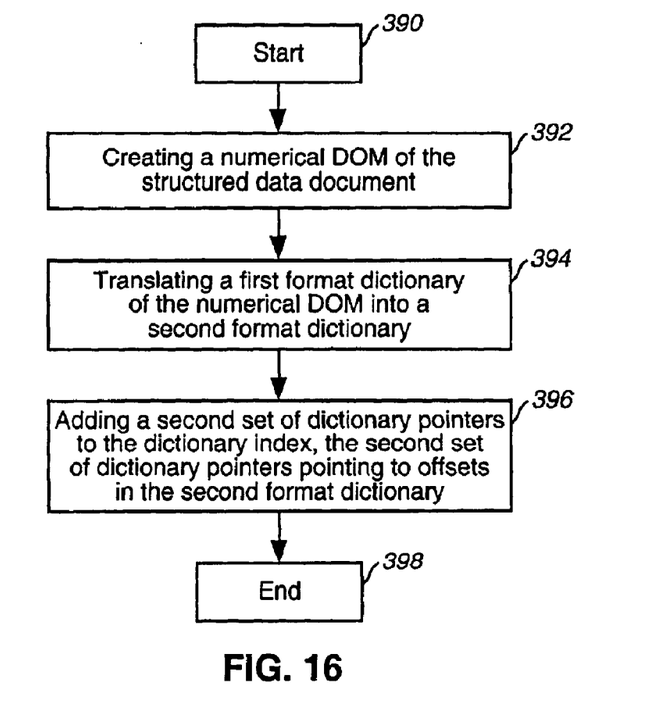
FIG. 16 is a flow chart of the steps used in a method of translating a structured data document in accordance with one embodiment of the invention.

FIG. 16 is a flow chart of the steps used in a method of translating a structured data document in accordance with one embodiment of the invention. The process starts, step 390, by creating a numerical DOM of the structured data document at step 392. A first format dictionary is translated into a second format dictionary at step 394. At step 396 a second set of dictionary pointers are added to the dictionary index. The second set of dictionary pointers point to the offsets in the second format dictionary which ends the process at step 398. In one embodiment, a plurality of dictionary offset pointers are converted to a plurality of dictionary index pointers. This converts the map so it points to the dictionary index rather than the offsets into the dictionary, since there are two dictionaries now.

Figure 17:
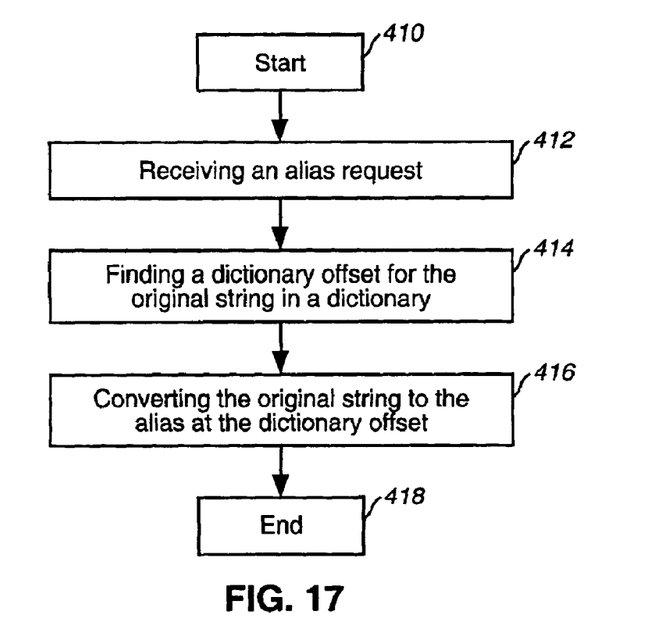
FIG. 17 is a flow chart of the steps used in a method of creating an alias in a numerical document object model in accordance with one embodiment of the invention.

FIG. 17 is a flow chart of the steps used in a method of creating an alias in a numerical document object model in accordance with one embodiment of the invention. The process starts, step 410, by receiving an alias request at step 412. A dictionary offset for the original string in a dictionary is found at step 414. At step 416 the original string is converted to the alias at the dictionary offset which ends the process at step 418. An alias index is created that associates the alias and the original string or the dictionary offset of the original string, and in one embodiment the creation of the alias index includes creating an array that matches the dictionary offset to the original string. In another embodiment, the original string is transformed to form a string hashing code. An associative lookup in the dictionary is performed to find the dictionary offset.

A method of performing a search of a numerical document object model begins when the system receives a query. The query is transformed to form a fully qualified hashing code. An associative lookup is performed in a map index using the fully qualified hashing code. Finally, a map offset is returned. In one embodiment, an identified couplet of the numerical DOM is converted into an XML string. In another embodiment, it is determined if the target is a complete data string. When the target is a complete data string, the complete data string is transformed to form a complete hashing code. An associative lookup is performed in a dictionary index using the complete data hashing code. A dictionary offset is returned. The numerical DOM is scanned for the dictionary offset, and a data couplet is returned. In another embodiment the data couplet is converted into a data XML string. In another embodiment, the system determines if the target is a wildcard data string. When the target is the wildcard data string, performing a sliding window search of a dictionary. The system returns a dictionary offset of a match and scans the numerical DOM for the dictionary offset. An incomplete data couplet is returned.

Thus there has been described a method of performing searches of a numerical DOM that is significantly more efficient than searching the structured data document.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of performing a search of a numerical DOM, comprising the steps of:
   (a) receiving a query;
   (b) when the query is a fully qualified query, transforming a target string to form a fully qualified hashing code;
   (c) performing an associative lookup in a map index using the fully qualified hashing code;
   (d) returning a map offset;
   (e) returning a data couplet.

2. The method of claim 1, wherein step (b) further includes the step of:
   (b1) performing a linear feedback shift register operation on the target string to from the fully qualified hashing code.

3. The method of claim 1, further including the steps of:
   (f) converting an identified couplet of the numerical DOM into an XML string.

4. The method of claim 3, further including the steps of:
   (g) converting the data couplet into a data XML string.

5. The method of claim 1, wherein step (a) further includes the steps of:
   (a1) when the query is a partially qualified query, transforming a target to form a partially qualified hashing code;
   (a2) performing an associative lookup in a dictionary index using the partially qualified hashing code;
   (a3) returning a dictionary offset;
   (a4) locating the complete string in the dictionary, using the dictionary offset;
   (a5) locating a pointer in a map index using the complete string;
   (a6) locating the complete reference in the numerical DOM using the pointer.

6. The method of claim 5, wherein step (a2) further includes the step of:
   (i) performing a modulo two polynomial division on the target to form the partially qualified hashing code.

7. The method of claim 1, wherein step (a) further includes the steps of:
   (a1) when the query includes a wildcard target, scanning a dictionary for the wildcard target;
   (a2) returning a complete string from the dictionary that contains the wildcard target;
   (a3) locating a pointer in a map index using the complete string;
   (a4) locating a couplet in the numerical DOM using the pointer.

8. A method of performing a search of a numerical DOM comprising the steps of:
   (a) receiving a query;
   (b) determining a target type of the query;
   (c) when the target type is an incomplete data string, performing a sliding window search of a dictionary;
   (d) returning a complete data string; and
   (e) returning an incomplete data couplet.

9. The method of claim 8, wherein step (d) further includes the step of
   returning a plurality of dictionary offsets.

10. The method of claim 8, further including the steps of:
    (f) when the target type is an incomplete tag and a complete data string, transforming the incomplete tag to form an incomplete target hashing code;
    (g) performing an associative lookup in a map index using the incomplete tag hashing code;
    (h) returning at least one map offset.

11. The method of claim 10, further including the steps of:
    (i) transforming the complete data string to form a complete data string hashing code;
    (j) performing an associative lookup in the map index;
    (k) returning a data string map offset;
    (l) comparing at least one map offset and the data string map offset.

12. A method of translating a structured data document, comprising the steps of:
    (a) creating a numerical DOM of the structured data document;
    (b) translating a first format dictionary of the numerical DOM into a second format dictionary; and
    (c) adding a second set of dictionary pointers, the second set of dictionary pointers pointing to offsets in the second format dictionary.

13. The method claim 12, further including the steps of:
    (d) converting a plurality of dictionary offset pointers to a plurality of dictionary index pointers.

14. A method of creating an alias in a numerical DOM, comprising the steps of:
 (a) receiving an alias request;
 (b) finding a dictionary offset for the original string in a dictionary; and
 (c) converting the original string to the alias at the dictionary offset.

15. The method of claim 14, further including the steps of:
 (d) creating an alias index.

16. The method of claim 14, wherein step (b) further includes the steps of:
 (b1) transforming the original string to form a string hashing code;
 (b2) performing an associative lookup in the dictionary to find the dictionary offset.

17. The method of claim 15, wherein step (d) includes creating an array that matches the dictionary offset to the original string.

18. A method of performing a search of a numerical DOM, comprising the steps of:
 (a) receiving a query;
 (b) transforming the query to form a fully qualified hashing code;
 (c) performing an associative lookup in map index using the fully qualified hashing code; and
 (d) returning a map offset.

19. The method of claim 18, further including the steps of:
 (e) converting an identified couplet of the numerical DOM into an XML string.

20. The method of claim 18, further including the steps of:
 (e) determining if the target is a complete data string;
 (f) when the target is a complete data string, transforming the complete data string to form a complete hashing code;
 (g) performing an associative lookup in a dictionary index using the complete data hashing code;
 (h) returning a dictionary offset;
 (i) scanning the numerical DOM for the dictionary offset;
 (j) returning a data couplet.

21. The method of claim 20, further including the steps of:
 (k) converting the data couplet into a data XML string.

22. The method of claim 18, further including the steps of:
 (e) determining if the target is a wildcard data string;
 (f) when the target is the wildcard data string, performing a sliding window search of a dictionary;
 (g) returning a dictionary offset of a match;
 (h) scanning the numerical DOM for the dictionary offset;
 (i) returning an incomplete data couplet.

* * * * *